United States Patent
Andre

(10) Patent No.: US 8,469,384 B2
(45) Date of Patent: Jun. 25, 2013

(54) DISCONNECTABLE ARTICULATED CONNECTION BETWEEN TWO SUCCESSIVE ROAD-GOING MODULES OF A ROAD TRAIN

(75) Inventor: Jean-Luc Andre, Molsheim (FR)

(73) Assignee: Lohr Industrie, Hangenbieten (FR)

( * ) Notice: Subject to any disclaimer, the term of this patent is extended or adjusted under 35 U.S.C. 154(b) by 338 days.

(21) Appl. No.: 12/990,903

(22) PCT Filed: May 5, 2009

(86) PCT No.: PCT/FR2009/000526
§ 371 (c)(1),
(2), (4) Date: Jan. 6, 2011

(87) PCT Pub. No.: WO2009/141525
PCT Pub. Date: Nov. 26, 2009

(65) Prior Publication Data
US 2011/0266772 A1    Nov. 3, 2011

(30) Foreign Application Priority Data

May 6, 2008 (FR) ...................................... 08 02522

(51) Int. Cl.
*B62D 53/00* (2006.01)
(52) U.S. Cl.
USPC .......................................... 280/408; 280/410
(58) Field of Classification Search
USPC ....................... 280/408, 410, 411.1
See application file for complete search history.

(56) References Cited

U.S. PATENT DOCUMENTS

| | | | | |
|---|---|---|---|---|
| 3,740,076 A * | 6/1973 | Cupp | | 280/432 |
| 4,397,474 A * | 8/1983 | Mettetal | | 280/476.1 |
| 4,794,867 A | 1/1989 | Titz | | |
| 7,658,396 B2 | 2/2010 | Koch et al. | | |
| 2006/0170188 A1 | 8/2006 | Negre et al. | | |
| 2010/0044998 A1 | 2/2010 | Franchineau | | |
| 2012/0242061 A1 * | 9/2012 | Wulff | | 280/477 |

FOREIGN PATENT DOCUMENTS

| | | |
|---|---|---|
| DE | 44 11 241 A1 | 10/1995 |
| DE | 10 2005 035 561 A1 | 3/2007 |
| EP | 0 277 305 A1 | 8/1988 |
| EP | 0 536 433 A1 | 4/1993 |
| EP | 1 864 834 A1 | 12/2007 |
| FR | 712 379 | 10/1931 |
| FR | 2 930 928 A1 | 11/2009 |
| JP | 2000 247266 A | 9/2000 |
| WO | 00/46050 A1 | 10/2000 |
| WO | 2004/014715 A2 | 2/2004 |
| WO | 2007/132121 A1 | 11/2007 |

* cited by examiner

*Primary Examiner* — Tashiana Adams
(74) *Attorney, Agent, or Firm* — Davis & Bujold, PLLC

(57) ABSTRACT

The articulated connection which is disconnectable and formed of a hitching device (6) with a drawbar component (7) for rapid coupling and uncoupling (5). The articulated connection is carried at the front of the following road module (2) and fixed in terms of orientation with respect to a central longitudinal axis (12) of the leading road module (1), independent of the steering axle of the following road module or of its steering assembly, and it has a rear end (9) of the piece pivot-mounted (14) on the chassis of the following road module (2) and a front end has a complementary coupling and uncoupling mechanism, together with roll and pitch travel mechanism and angular end stop mechanism. This device is applicable to the urban transport of passengers.

16 Claims, 3 Drawing Sheets

DISCONNECTABLE ARTICULATED CONNECTION BETWEEN TWO SUCCESSIVE ROAD-GOING MODULES OF A ROAD TRAIN

This application is a National Stage completion of PCT/FR2009/000526 filed May 5, 2009, which claims priority from French patent application serial no. 08/02522 filed May 6, 2008.

FIELD OF THE INVENTION

The present invention relates to a disconnectable articulated connection between two successive motorized road modules for forming a road train which consists of a plurality of motorized road modules articulated so as to be disconnectable from one another.

The present invention also relates to the road module that can be hitched and articulated on either end of and to similar vehicles in order to constitute a road train. It also relates to the road train formed in this way.

SUMMARY OF THE INVENTION

This disconnectable articulated connection is composed of a coupling means provided on the leading road module in a series of two road modules and a hitching drawbar component carried on the front of the trailing road module. The drawbar piece has an articulated rear extremity pivoting on a vertical axle on a pivot center that is independent from the adjacent axle or from the directional assembly of the trailing vehicle and a front extremity which is disconnectably coupled to the rear of the leading module, but fixed in direction relative to the leading module. These connections allow enough freedom for rolling and pitching so that motion can proceed in complete safety, as well as an angular directional limitation on the trailing module when needed.

There may be an attached connection between the drawbar and the directional control for the trailing modules or between the drawbar and the trailing module. This connection may be functionally formed as a device to set the course of the trailing module.

Since there is only one driver for the convoy, it is important that the dynamic comportment of this small train be as close as possible to that of an isolated module, particularly in light of the fact that the driver passes from single vehicle mode to group mode without any transition.

This mechanical inter-module connection must set the trajectory of the following vehicle and ensure that a minimum distance remains between the modules both in a straight line and when on curves, as well as holding the electric or pneumatic connectors or other connectors to be used.

The field of urban and inter-urban road vehicle passenger transportation is currently turning to solutions that utilize trains in a series formed of several independent modules in isolation, but which can be grouped into a series of trains and then rapidly disconnected. In several instances, such as the temporary use of road trains or separate vehicles, or when returning vehicles from one place to another due to mechanical breakdown, and other situations, it is always necessary to maintain minimal distance between modules in order to, among other things, make it impossible for people along the road, passers-by, cyclists, etc., to cross the convoy. Generally, for example, on small tourist vehicles, there are unattractive chains located on either side of the drawbar that provide this security.

In the scope of the invention, it is not necessary to provide additional protection to fulfill this function.

The flexibility and modular nature of this public urban transportation form make it particularly attractive from all points of view to urban administrators seeking public transportation equipment.

Implementing this transportation technique then poses two important problems that must be resolved simultaneously. The first is the convenience, speed, and reliability of the articulated inter-modular connection and disconnecting it, and the second, the ability of passengers to circulate between vehicles.

To resolve the first problem, it is necessary to use an adapted and quickly disconnectable articulated connector to guarantee that a minimum of space exists between modules at least when in a straight line, which is the object of the present invention.

According to the present invention, the disconnectable connection is a hitching device, for example, a short hitch comprising a drawbar component or traction bar that is fixed in direction relative to the longitudinal axis of the leading module. This articulated connection allows a quasi-monotrace course to be set for the following vehicles. This articulated connection is quickly disconnectable from the leading module and the drawbar component is supported by the trailing module at its front portion. In addition, this connection comprises all the electrical, pneumatic or other connections necessary to transmit control and safety data between the modules.

This solution also applies to smaller road vehicles for transporting only a few people or even one person where no passageway is required for circulating between modules and where the distance between modules also must be as small as possible for safety reasons. In this case as well, the trajectory of the trailing vehicles must also be controlled completely.

The invention also relates to a road module having the above characteristics and which can be hitched and articulated at either end to similar modules to form a road train. It also relates to the road train formed in this way.

BRIEF DESCRIPTION OF THE DRAWINGS

Other features and advantages of the invention will become apparent from the following description provided by way of example and from the accompanying drawings, in which.

DETAILED DESCRIPTION OF THE PREFERRED EMBODIMENTS

Figure 1:
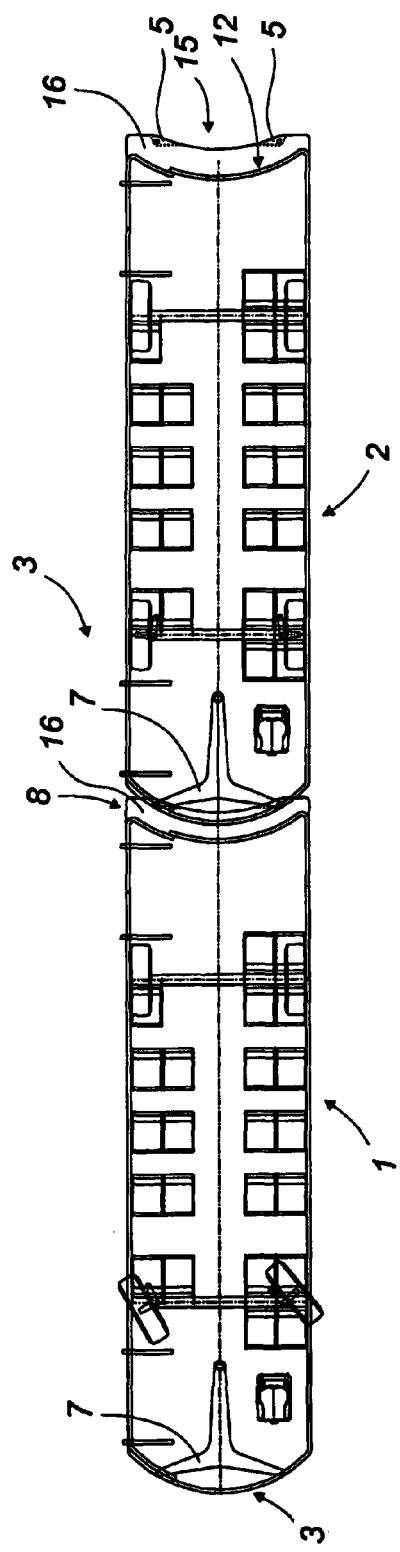
FIG. 1 is a plane view of several road modules interconnected by the mechanical connection that is the object of the invention in a straight line configuration.

The present invention relates not only to the articulated connection between two road modules, but also to the road module having the features described above and capable of being hitched and articulated to similar modules in order to constitute a road train, and to the road train thus formed.

The present invention proceeds from the generally inventive concept that consists of providing, as an articulated disconnectable connection between two successive road modules, one a leading module 1 and one a trailing module 2 which constitute a road train 3 when connected, a disconnectable connection and directional assembly 4 formed of two disconnectable portions. These two disconnectable portions are composed of rapid connecting and disconnecting elements 5 and a hitching device 6, for example, with a drawbar component 7 supported below the front of trailing road module 2 and directionally fixed relative to the median longitudinal axis of the leading road module.

Generally speaking, there is a connection and directional assembly 4 that is disconnectable, which in a straight line procures an inter-modular space 8 of shortened length and preferably as short as possible.

More specifically and preferably, the drawbar component 7 terminates on one side beneath the trailing module 2 below its front portion, where it is pivotably mounted by its rear extremity 9 in median longitudinal position near the axis of the front axle. Drawbar component 7 terminates on the other side in a front extremity 10 having complementary connection and disconnection elements 11, preferably of the rapid type.

Rapid coupling and uncoupling elements or disconnectable attachments or any other means may be used to separate and rejoin the two portions of the hitching device.

These elements may be associated with automatic locking and unlocking devices as well as with auto-centering devices.

Preferably the drawbar component is located on the perimeter of the portion of each trailing module that contacts the ground.

Depending upon the application, this disconnectable articulated connection is designed so that the free space existing between successive modules is as short as possible.

As indicated, there may be a disconnectable short hitching device.

For the description, it is considered that a road train is formed of a plurality of modules, for example, identical modules, and that the modules of each pair of two successive road modules are joined in the same articulated and disconnectable manner. This supports the presumption that the following description is complete if it refers to a single disconnectable articulated connection with all its variations.

Therefore, the following description will deal with only two successive road modules, one upstream and one downstream, respectively termed the leading module 1 and the trailing module 2 of a road train comprised of a plurality of road modules that are similar or identical to one another, and identical or similar to those shown in the drawings and used as examples.

The essential feature is the ability to constitute the disconnectable articulated connection between two successive modules using a connector compatible with maintaining a short distance between modules in a straight line configuration.

At the base of the front rear surface 12 of leading module 1 the rapid coupling and uncoupling means 5 are situated, preferably with automatic locking and unlocking and auto-centering capabilities for a hitching assembly whose drawbar component 7 ensures the disconnectable articulated mechanical connection with the trailing module 2.

There may be a total traction connection, but also a partial traction connection, that is, a connection through which only small traction forces pass because trailing module 2 retains and puts to work its drive power or a portion of it which is automatically regulated for total or partial use. As there is only one driver to conduct the train, the connections required to control traction and braking pass through cables integrated with the connection which are automatically connected when hitched.

This drawbar component may be a triangular, T-shaped or I-shaped mechanical assembly, or a simple traction bar. The drawbar of the short hitching assembly may be made differently using various current techniques.

Drawbar component 7 has a front extremity that attaches automatically, locks, auto-centers, and is detachable with the rapid coupling and uncoupling means that exist at the rear of leading module 1 in order to ensure that the drawbar component is fixed in the direction of the longitudinal axis of leading module 1.

Drawbar component 7 terminates on the downstream side in a rear extremity that is pivotably mounted or serves as a pivoting articulation 14 cooperating with a pivot center independent of the steering axle or the directional assembly of trailing road module 2, or is pivotably mounted on the module chassis. The location of this articulation is selected so as to permit the trailing vehicles to travel in a quasi-monotrace trajectory.

Obviously, some play and a degree of freedom to pivot on the pitch axle and the roll axle are necessary to absorb variations in the shape of the road and displacement associated with travel.

Preferably, drawbar component 7 is supported by trailing road module 2. It is located at a low level, retracted below the forward face surface 13 so as not to project from the front of trailing module 2 for mechanical protection purposes, but also for esthetics.

Conversely, and also preferably but not necessarily, the connection and disconnection means supported by the rear portion of leading module 1 are located on the lower portion projecting from the rear face surface 12 of leading module 1 opposite one another and mechanically protected by a projecting edge 15.

Figure 3:
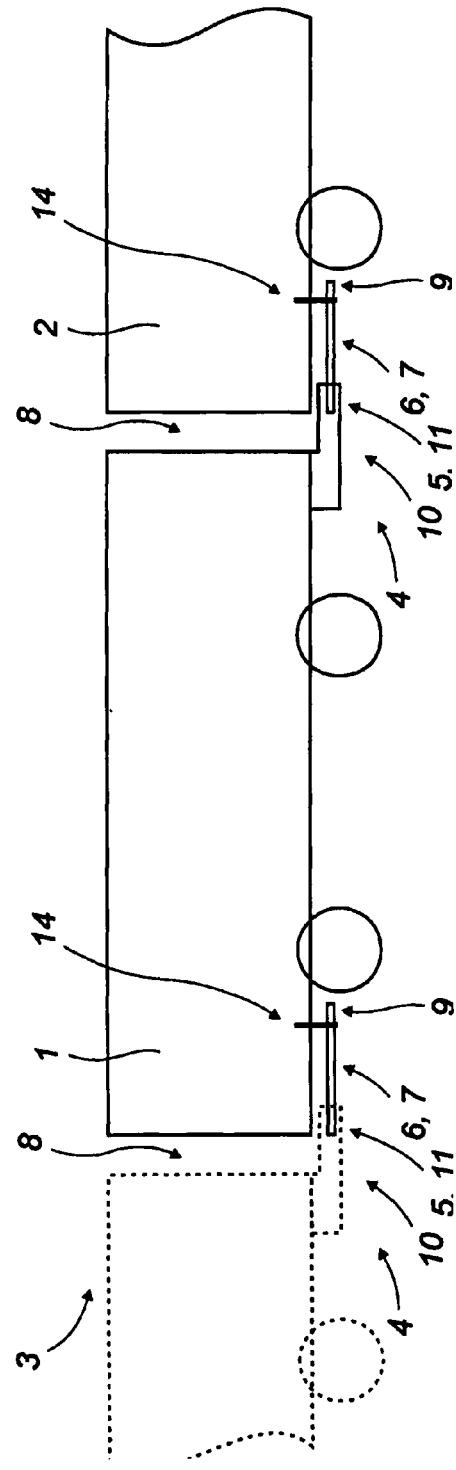
FIG. 3 is a schematic general profile view showing a series of three road modules articulated one after the other.

This projecting edge 15, easily visible in FIG. 3, may have a flat upper surface serving as a floor platform passageway 16 for passengers called an intercommunicating gangway between the two modules, its width defining the depth of the inter-modular space. The upper portion of this platform 16 or that of a top layer, an upward extension or other equivalent, is essentially level with the floors of the road modules on either side.

To keep the intermediate space 8 between the modules as short as possible, in a preferred version, it is necessary that while still allowing all the usual turning angles, the surface shapes facing successive road modules must be disengaged and not obstructive.

For this reason, curved shapes like the ones shown are desirable but not necessary; it is also conceivable to use curved or straight shapes on the rear of the vehicle to form a barrier preventing any intrusion between the modules.

More specifically, it is preferable to adopt circular shapes, particularly those with a center that is also the pivot center for drawbar component 7.

Figure 2:
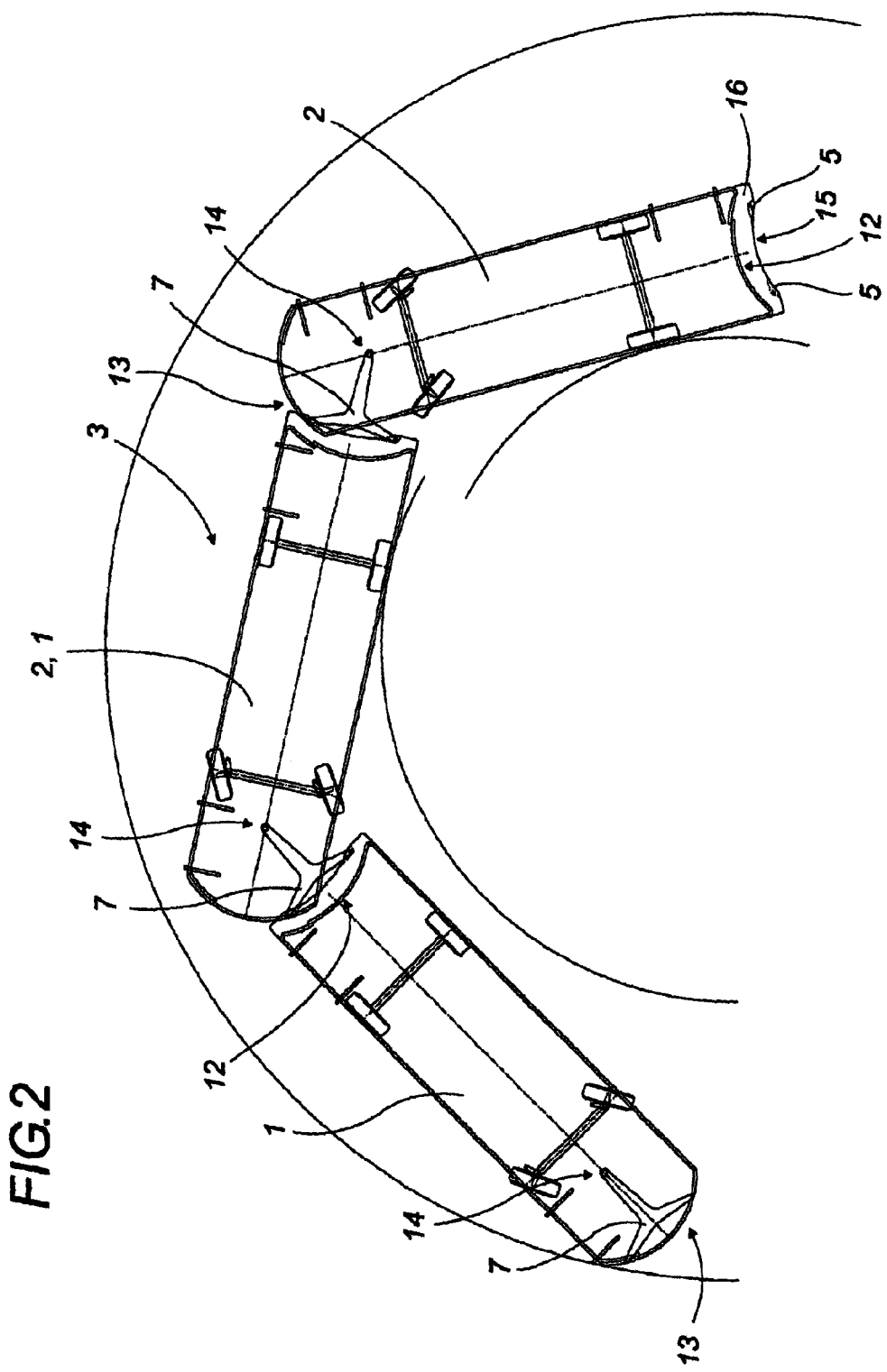
FIG. 2 is a plane view of several road modules interconnected during a turn.
Figure 4:
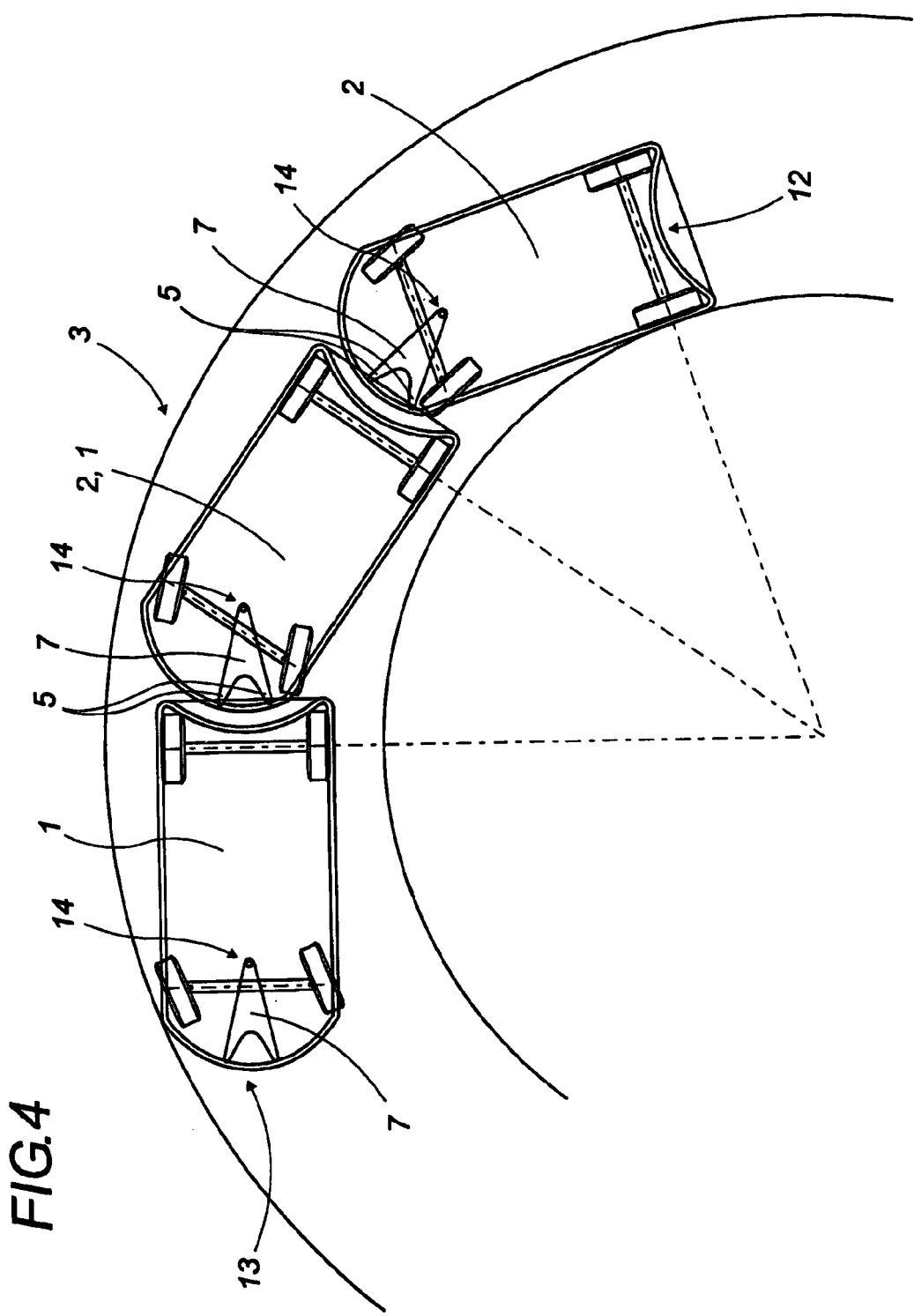
FIG. 4 is a plane view of a road train formed of small modules.

As seen in FIGS. 1, 2 and 3, the road module variation shown by way of example, with curved front and rear face surfaces 12 and 13 on the road modules, considerably reduces inter-modular depth and thus the width of platform 16 which serves in one variation as a support for an intercommunicating gangway for passengers.

To ensure continuity between the plane surfaces of the coupling means and drawbar component 7, the two portions of the disconnectable articulated inter-module connection are located at the same level.

On one end, drawbar component 7 is placed at a low level below the carriage of following road module 2, preferably retracted and not projecting from the forward face surface 13;

on the other end, the coupling and uncoupling elements are located opposite the corresponding extremity of drawbar component 7.

As indicated, these coupling and uncoupling elements may be located at the end of a projection 15 with a flat upper portion forming a platform 16 at the base of the rear of leading module 1, which platform is located at the same level as the floor of two successive road modules and serves as a floor support for the intercommunicating gangway on the road module variation that offers communication.

The width of platform 16 therefore also represents the width of the space between the opposing surfaces of the road modules.

There is a supplemental element to recall drawbar component 7 into its longitudinal position so as to prevent finding a trailing module with a diagonal drawbar component 7 after uncoupling if this process occurs on a curve. This recall feature in the vehicle axle is also necessary for ease in coupling the modules.

Angular blocks also exist to limit the drawbar component's angle of orientation, preventing the occurrence of dangerous orientation, particularly during maneuvers.

This can be accomplished by using either physical blocks or virtual blocks.

Finally, in order to diminish directional forces in the drawbar component, there may be a means for assisting wheel orientation in the front wheels of trailing module 2.

The present invention also relates to the road module having the features described above and capable of being hitched and articulated to similar modules to constitute a road train, and to the road train formed in this way.

Thus, among other things, it comprises the disconnectable connecting and orientation assembly with a hitching device (6), for example, drawbar component 7, and the coupling and uncoupling elements with locking and unlocking capability; and as a variation, the projecting edge 15 on upper platform 16.

The invention claimed is:

1. A disconnectable articulated connection between two successive road modules of a road train formed of a plurality of successive motorized road modules and comprising a leading road module (1) and a trailing road module (2) each having at a front thereof a directional assembly, wherein the directional assembly comprises:
   a disconnectable connection and orientation assembly (4) comprising a hitching device (6) and a rapid connection and disconnection means,
   the hitching device (6) is supported by the trailing module (2), below a front portion and pivotably mounted relative to a chassis thereof and fixed in orientation relative to the leading road module (1),
   the connection and disconnection elements are each formed of two complementary portions, one placed at a rear of each of the road modules and the other placed at an extremity of the hitching device constituting the disconnectable portion of the articulated connection; and
   the hitching device is fixed in its directional orientation relative to the leading road module (1), and independent of the drive axle of the trailing road module (2) or of its directional assembly;
   the disconnnectable connection has:
   a means for rolling and pitching displacement, and
   an angular block means.

2. The articulated connection according to claim 1, wherein the hitching device is pivotably attached by one of its extremities beneath the front of the chassis of the road module along a median longitudinal position near an axis of the front axle.

3. The articulated connection according to claim 1, wherein the disconnectable connection device comprises:
   a drawbar component (7) disconnectable from the leading road module (1) and fixed in direction relative to it,
   rapid, complementary elements for the connection or disconnection of the articulated rapid coupling and uncoupling connection, some at the rear of the leading road module (1) and some at the front extremity (10) of the drawbar component (7); and
   the drawbar component (7) is:
   supported at the front by trailing road module (2),
   fixed in orientation relative to the median longitudinal axis of the leading road module (1),
   pivotably mounted relative to the chassis of the trailing road module (2),
   independent of the directional axle of the trailing road module (2) or of its directional assembly; and it has
   a rear extremity (9) pivotably mounted on the chassis of the trailing road module (2), and a front extremity (10) comprising coupling and uncoupling elements constituting the disconnectable portion of the articulated connection,
   a means for rolling and pitching displacement,
   an angular block means.

4. The articulated connection according to claim 1, wherein the hitching assembly is a relatively short hitch.

5. The articulated connection according to claim 1, wherein the rapid connection and disconnection means is a coupling and uncoupling means.

6. The articulated connection according to claim 3, wherein the drawbar component (7) is a telescopic type drawbar.

7. The articulated connection according to claim 3, wherein the drawbar component (7) is a relatively short hitching articulation with crossed connecting rods.

8. The articulated connection according to claim 1, wherein a space, located between the leading module (1) and the trailing module (2), is as short as possible.

9. The articulated connection according to claim 3, wherein the drawbar component (7) is mounted on a front lower portion of the trailing module (2).

10. The articulated connection according to claim 3, wherein the drawbar component (7) terminates in front of the trailing road module (2) and the corresponding opposing portion on the leading road module (1) of the articulated connection between the leading road module (1) and the trailing road module (2) is a projection (15) from the lower rear portion of the leading module (1).

11. The articulated connection according to claim 10, wherein the projection (15) has a plane upper portion in the form of a platform (16), the upper portion of which is situated essentially at a same level as a floor of each successive road module, serving as a floor for passing between modules.

12. The articulated connection according to claim 11, wherein the two portions of the disconnectable articulated connection are coplanar with one another.

13. The articulated connection according to claim 3, wherein a front extremity of the drawbar component (7), supported by the trailing road module (2), is retracted from a forward face surface (13) of the trailing road module (2).

14. The articulated connection according to claim 1, wherein the articulated connection has recall means in a central position of the drawbar component (7).

15. The articulated connection according to claim 1, wherein the articulated connection has an angular block on each side for right and left turns.

16. The articulated connection according to claim 1, wherein the articulated connection includes a means for assisting with front wheel orientation, for the trailing road module (2), depending upon an orientation of the drawbar component (7).

\* \* \* \* \*